(12) United States Patent
Bättig et al.

(10) Patent No.: US 7,997,857 B2
(45) Date of Patent: Aug. 16, 2011

(54) PARTICLE VIBRATION DAMPER

(75) Inventors: Josef Bättig, Egliswil (CH); Karl-Heinz Rohne, Villigen (CH); Alfons Tröndle, Dogern (DE)

(73) Assignee: ABB Turbo Systems AG, Baden (CH)

( * ) Notice: Subject to any disclaimer, the term of this patent is extended or adjusted under 35 U.S.C. 154(b) by 100 days.

(21) Appl. No.: 12/364,821

(22) Filed: Feb. 3, 2009

(65) Prior Publication Data

US 2009/0185897 A1    Jul. 23, 2009

Related U.S. Application Data

(63) Continuation of application No. PCT/EP2007/058149, filed on Aug. 6, 2007.

(30) Foreign Application Priority Data

Aug. 4, 2006    (EP) .................................. 06405333

(51) Int. Cl.
*F04D 29/66*    (2006.01)

(52) U.S. Cl. ....................... 415/119; 415/204

(58) Field of Classification Search .................. 415/119, 415/204
See application file for complete search history.

(56) References Cited

U.S. PATENT DOCUMENTS

| | | | |
|---|---|---|---|
| 4,204,586 A * | 5/1980 | Hani et al. ..................... 181/229 |
| 4,453,887 A | 6/1984 | Schucker | |
| 4,504,188 A * | 3/1985 | Traver et al. ..................... 415/1 |
| 6,237,302 B1 | 5/2001 | Fricke | |
| 6,547,049 B1 | 4/2003 | Tomlinson | |
| 2003/0147712 A1 | 8/2003 | Kai et al. | |
| 2004/0163390 A1 | 8/2004 | Hummel | |
| 2007/0151242 A1 | 7/2007 | Trondle et al. | |

FOREIGN PATENT DOCUMENTS

| | | |
|---|---|---|
| DE | 103 60 770 A1 | 7/2005 |
| EP | 1 098 069 A2 | 5/2001 |
| EP | 1 422 401 A2 | 5/2004 |
| EP | 1 602 803 A1 | 12/2005 |
| JP | 2003-175436 A | 6/2003 |
| JP | 2004239350 A | 8/2004 |
| JP | 2006125195 A | 8/2006 |
| WO | WO 99/48951 A2 | 9/1999 |
| WO | 2005119031 A1 | 12/2005 |

OTHER PUBLICATIONS

Bryce L. Fowler et al., "Effectiveness and Predictability of Particle Damping", pp. 1-12.
International Search Report.
European Search Report.
International Preliminary Report on Patentability issued Feb. 17, 2009 in International Patent Application No. PCT/EP2007/058149.

* cited by examiner

*Primary Examiner* — Edward Look
*Assistant Examiner* — Dwayne J White
(74) *Attorney, Agent, or Firm* — Buchanan Ingersoll & Rooney PC

(57) ABSTRACT

Numerous cavities exist in a turbocharger for reasons of construction. If such cavities are filled with particles, inexpensive particle vibration dampers can be realized. Moreover, advantages with regard to additional containment security result in the case of possible bursting of the compressor wheel, and also with regard to noise suppression.

11 Claims, 6 Drawing Sheets

US 7,997,857 B2

PARTICLE VIBRATION DAMPER

RELATED APPLICATIONS

This application claims priority under 35 U.S.C. §119 to EP Application 06405333.3 filed in Europe on Aug. 4, 2006, and as a continuation application under 35 U.S.C. §120 to PCT/EP2007/058149 filed as an International Application on Aug. 6, 2007 designating the U.S., the entire contents of which are hereby incorporated by reference in their entireties.

TECHNICAL FIELD

The disclosure relates to the field of exhaust gas turbochargers for charged internal combustion engines. An exhaust gas turbocharger with a particle vibration damper is disclosed.

BACKGROUND INFORMATION

Exhaust gas turbochargers for charging internal combustion engines in most cases have a filter silencer in the compressor inlet. These silencers, with filter fitted, can be rigidly connected to the compressor casing by means of a fastening flange.

The exhaust gas turbocharger is fastened on the engine bracket either directly or by means of a special foot. In most cases, the axial distance between foot and silencer is very large. As a result of engine vibrations, the silencer can be excited to form impermissibly high vibrations. This is especially when the natural frequency of the silencer lies only marginally above that of the turbocharger fastenings. In this case, impermissible excessive vibration increases occur in the silencer.

One possibility of avoiding such excessive vibration increases is disclosed in DE 103 60 770. The silencer in this case is rigidly fastened on the compressor casing in a first connecting region, and in a second connecting region bears with a seating face on a seating face on the compressor casing, wherein the silencer, as a result of the seating in the second connecting region in relation to the rigid fastening in the first connecting region, is subjected to a pretensioning. As a result of the pretensioning, the natural frequency of the silencer is raised, wherein impermissible excessive vibration increases of the silencer can be prevented.

EP 1 098 069 B1 discloses a granulate-filled vibration damper for the component of a combustion system of a gas turbine power plant or of a component in cutting machining. The content of the said disclosure is hereby incorporated by reference into the present application.

SUMMARY

An exhaust gas turbocharger can be configured in such a way that impermissible excessive vibration increases can be suppressed.

An exhaust gas turbocharger is disclosed, comprising a casing with at least one cavity, wherein at least one cavity of the exhaust gas turbocharger, as a particle vibration damper, is filled at least partially with particles, wherein the cavity is formed with an annular shape.

In another aspect, a method is disclosed for realizing a particle-based vibration damper. Such a method comprises locating at least one annular-shaped cavity formed on a casing of an exhaust gas turbocharger; and filling the at least one annular-shaped cavity at least partially with particles. The particles in the at least one annular-shaped cavity serve to dampen vibration of the exhaust gas turbocharger.

BRIEF DESCRIPTION OF THE DRAWINGS

In the following, exemplary embodiments of the exhaust gas turbocharger with cavities, which according to the disclosure are filled with particles, are described with reference to the drawings. In the drawing.

DETAILED DESCRIPTION

An exemplary particle vibration damper can be arranged in the form of an annular cavity, which is filled with particles, in the region of the compressor of the turbocharger.

A hollow body which is filled with loose particles has an excellent damping capability under vibrational stress. In this case, the vibration energy is distributed as a result of the internal friction forces of the particles and damping of the vibrations is achieved in this way.

Numerous cavities exist in a turbocharger for reasons of construction. These cavities can be used as containers for accommodating the mentioned particles. As a result, on the one hand an inexpensive damper can be realized, which, moreover, also has the capability of being esthetically satisfactory.

These cavities in the casing of the exhaust gas turbocharger are formed with an essentially annular shape and are arranged concentrically to the axis of the exhaust gas turbocharger. A subdivided cavity, which consists of a plurality of annular segment-shaped cavities, or alternatively polygonal or oval annular cavities, or corresponding annular segments, which are arranged around the axis of the exhaust gas turbocharger, is also meant by annular.

The filling with particles, moreover, brings more advantages with regard to additional containment security in the case of possible bursting of the compressor wheel, and also with regard to noise suppression.

The particles are optionally formed essentially with a globular or spherical shape, i.e. in particular they do not have any pronounced corners or edges upon which the individual particles could mutually get caught up and jammed. This allows a friction-associated internal movement of the particle mass which promotes damping of vibrations.

Figure 1:
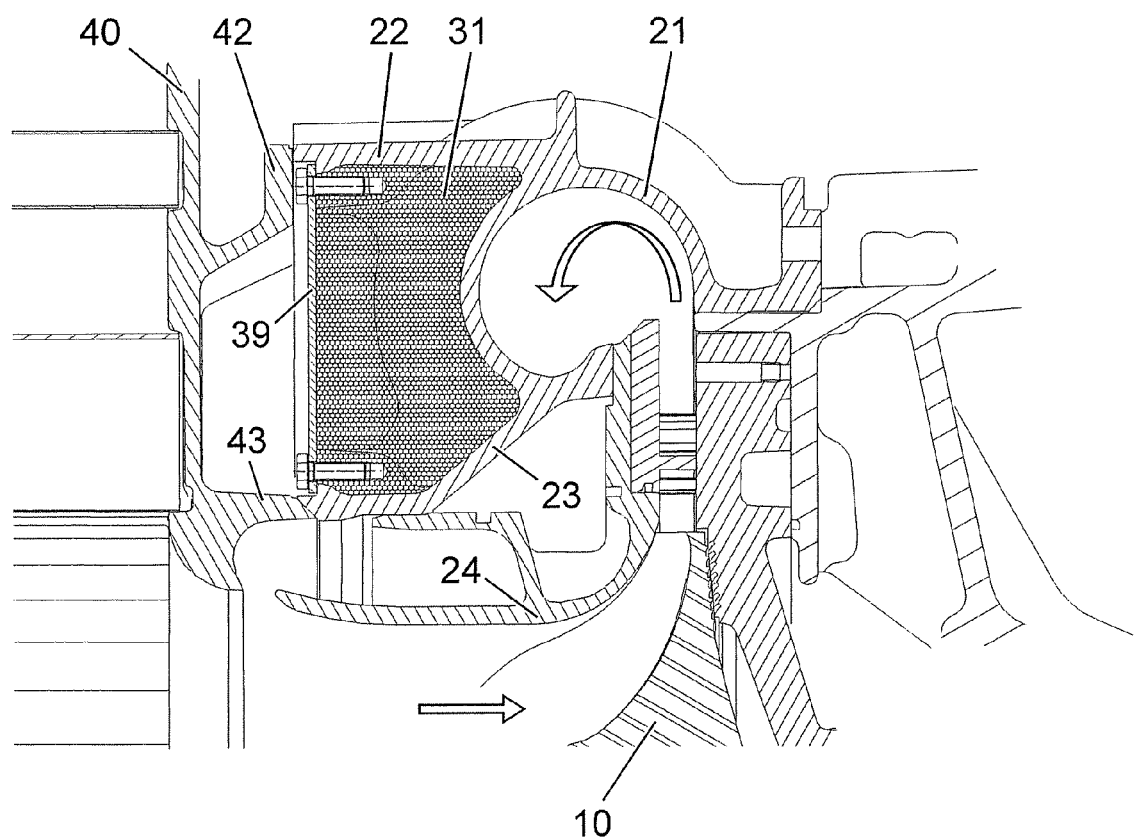
FIG. 1 shows an exemplary embodiment with a particle-filled cavity on the side on the compressor casing towards the filter silencer, and integrated in the exhaust casing of the compressor.

FIG. 1 shows the compressor side of an exhaust gas turbocharger. The compressor wheel 10 is rotatably mounted and enclosed by a compressor casing. The flow path of the medium which is to be compressed is indicated by the arrows. The compressor casing in the exemplary embodiment which is shown comprises two flanges 22 and 23, which are integrally formed with the exhaust casing 21, for fastening the filter silencer 40 on the compressor casing. For this, the filter silencer also comprises two flanges 42 and 43. Radially inside the two fastening flanges 22 and 23 the compressor casing comprises an insert wall 24 which in the region of the compressor wheel delimits the flow passage of the medium which is to be compressed.

According to the disclosure, the cavity 31 which extends between the radially outer flange 22 and the radially inner flange 23 is filled with particles for damping vibrations on the exhaust gas turbocharger. The cavity 31 is closed off with a cavity closure 39. In the exemplary embodiment which is shown, the cavity closure is a plate which by means of screws is screwed down tight over the opening between the two flanges 22 and 23. This opening can extend over a part of or over the entire circumference. If only a part is opened along the circumference, advantages result when filling and closing off; if the entire circumference is opened, advantages especially result when emptying the cavity.

The term particles in this case refers to an accumulation of particles which in comparison to the overall volume are small and of approximately equal grain size. The particle mass, after exceeding an activation energy, can behave as a fluid, that is to say can flow. The particles in this case are essentially maintained, or do not change their shape. In this way, the particles can be poured through the unclosed opening into the interior of the cavity before the cavity is then sealed with the cavity closure.

The cavity can be completely or only partially filled with particles. If a part of the cavity remains free of particles, this enables a certain flow of the individual particles. If this is not desired, the cavity should be completely filled. The cavity can be subdivided by means of ribs. This has the advantage that in the case of partial filling of the cavity which is subdivided into sections a uniform distribution of the particles over the circumference is still ensured.

For increasing the damping action, rubber granulate or rubber dust can be admixed with the particles, or the particles can be poured into the cavity together with a liquid, e.g., a damping liquid. For preventing wear on the walls of the cavity, the casing walls on the inner side of the cavity can be hardened or rubber-coated. Rubber-coating of the casing walls inside the cavity also leads to an improvement of the damping action.

The arrangement of the particle-filled cavity in the region between the exhaust casing 21 of the compressor and the filter silencer increases the bursting protection (containment). If the compressor wheel 10 should become detached from the turbine axis or even burst apart into individual fragments, then the particle-filled cavity, which is arranged radially outside the flow passage in the inlet section of the compressor wheel, leads to the compressor wheel, or fragments of it, not breaking through the casing in the radial direction. The high inertia of the particle mass absorbs a large part of the bursting energy as a result of internal friction of the individual particles. In this way, a simple but effective bursting protection can be realized which even in the case of existing turbochargers can be retrofitted by existing cavities being filled with particles and then being covered.

Figure 2:
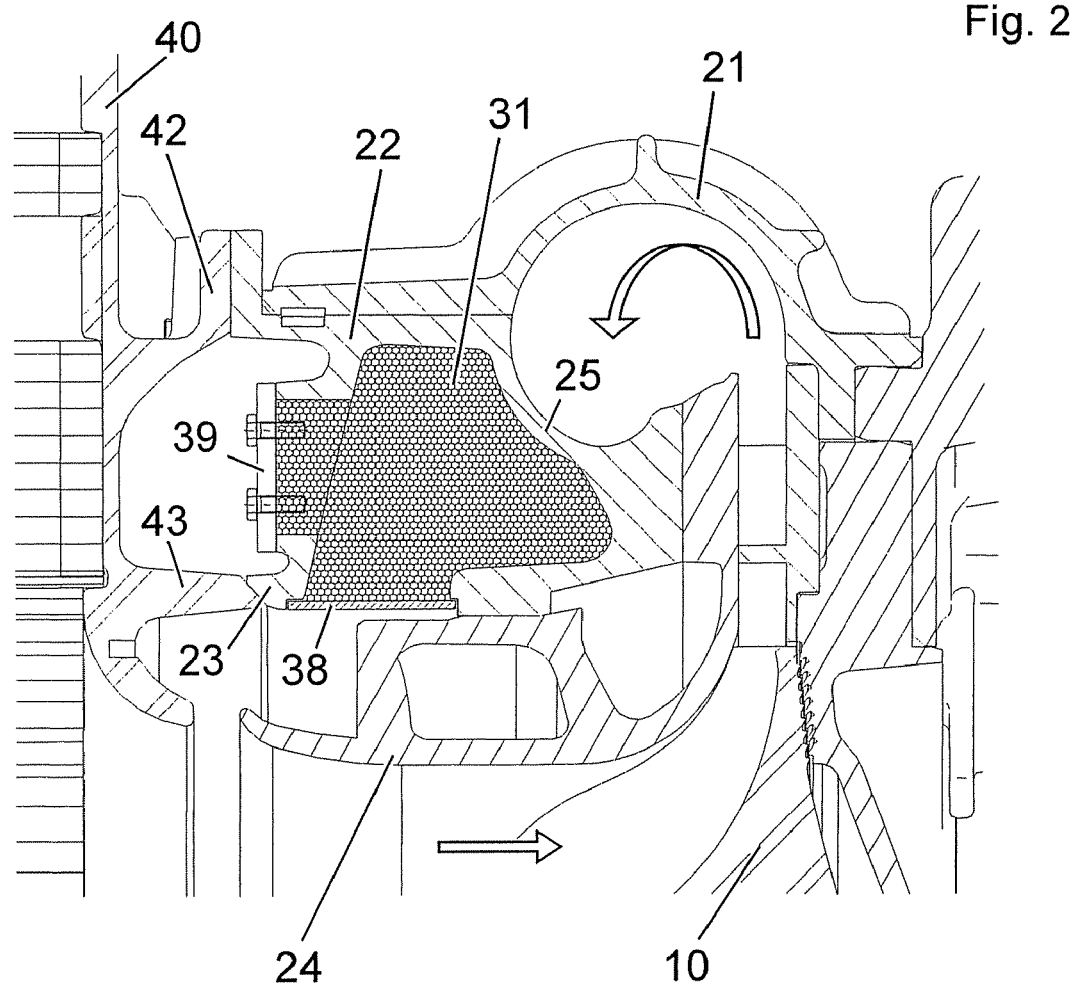
FIG. 2 shows an exemplary embodiment with a particle-filled cavity on the side on the compressor casing towards the filter silencer, and integrated in a separate casing insert of the compressor.

FIG. 2 shows an exemplary embodiment of an exhaust gas turbocharger, but with a separate casing insert 25 which is inserted between the exhaust casing 21 and the insert wall 24. The particle-filled cavity 31 is located inside the casing insert between the inner fastening flange 23 and the casing section which is adjacent to the flow passage. The cavity closure 39 is again formed as a plate which is fastened by screws and which covers an opening which is let into the casing insert. In the exemplary embodiment which is shown, an existing cavity of a compressor is filled with particles and sealed by means of an additional annular cover 38. By means of such cavity covers casing curvatures can be converted to form closed, annular cavities.

Figure 3:
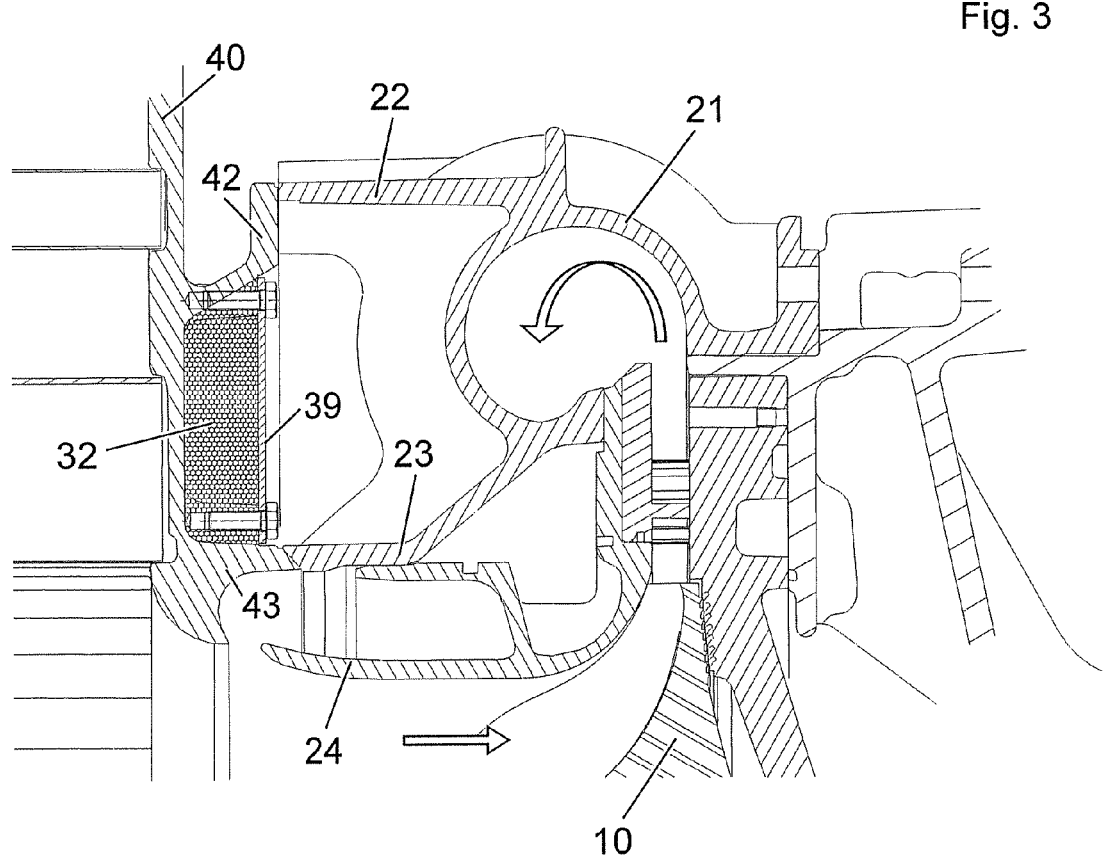
FIG. 3 shows an exemplary embodiment with a particle-filled cavity on the side on the filter silencer towards the compressor casing.

FIG. 3 shows an exemplary embodiment in which the particle-filled cavity 32 is formed on the housing of the filter silencer 40. The filter silencer also comprises two encompassing flanges 42 and 43 between which the encompassing cavity extends and is closed off by means of a plate-like cavity closure 39.

Figure 4:
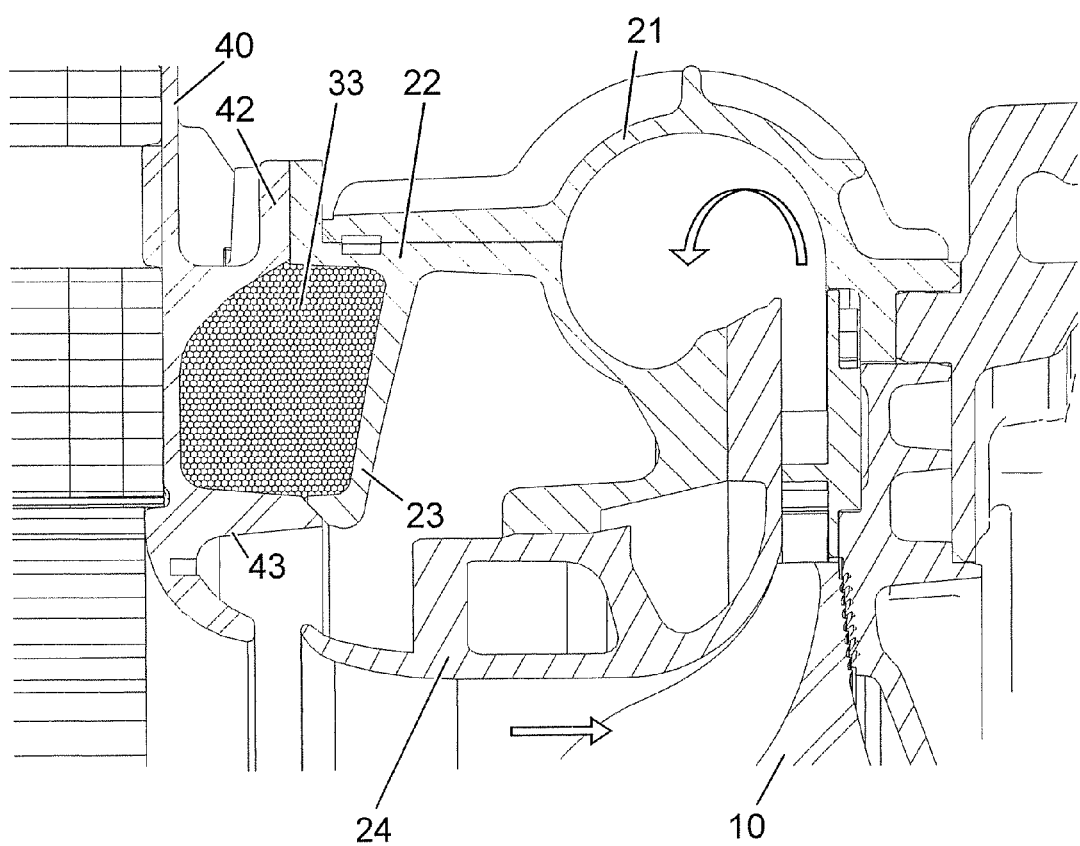
FIG. 4 shows an exemplary embodiment with a particle-filled cavity on the side between filter silencer and compressor casing.

FIG. 4 shows an exemplary embodiment in which the particle-filled cavity 33 extends between the assembled compressor casing 21 and housing of the filter silencer 40. The cavity in this case is delimited by the radially inner and outer flanges 22 and 42, or 23 and 43. Filling of the cavity is carried out by means of a separate opening, which is not shown, for example in the connecting collar of the flange 42 to the filter silencer 40, which opening can be closed off by means of a cavity closure.

Figure 5:
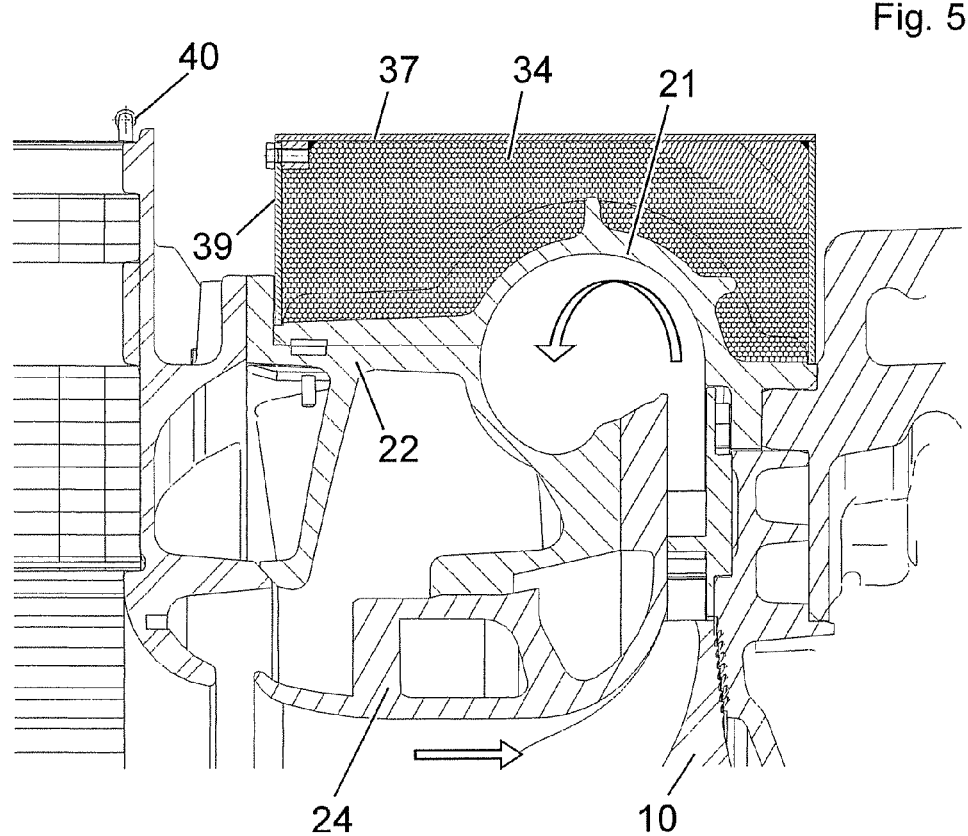
FIG. 5 shows an exemplary embodiment with a particle-filled cavity radially on the outside on the compressor casing.

FIG. 5 shows an exemplary embodiment in which the particle-filled cavity 34 radially encloses the entire compressor casing. Radially on the inside, the cavity is delimited by the exhaust casing 21. Radially on the outside, a cavity housing 37 encloses the cavity. The opening for filling of the particle mass into the interior of the cavity is arranged on one of the axial end faces of the cavity and closed off by means of a plate-like cavity closure. Alternatively, the opening can also be arranged on the generated surface of the cavity housing 37, that is to say radially towards the outside. The cavity housing 37, as shown, can be cylindrically formed with a rectangular cross section, or else have a partially circular-shaped or partially elliptically-shaped cross section.

In the exemplary arrangement of the particle-filled cavity in the radially outer region of the compressor casing according to FIG. 5, the heat and sound insulation is improved so that a conventional heat and sound insulation can be dispensed with.

Figure 6:
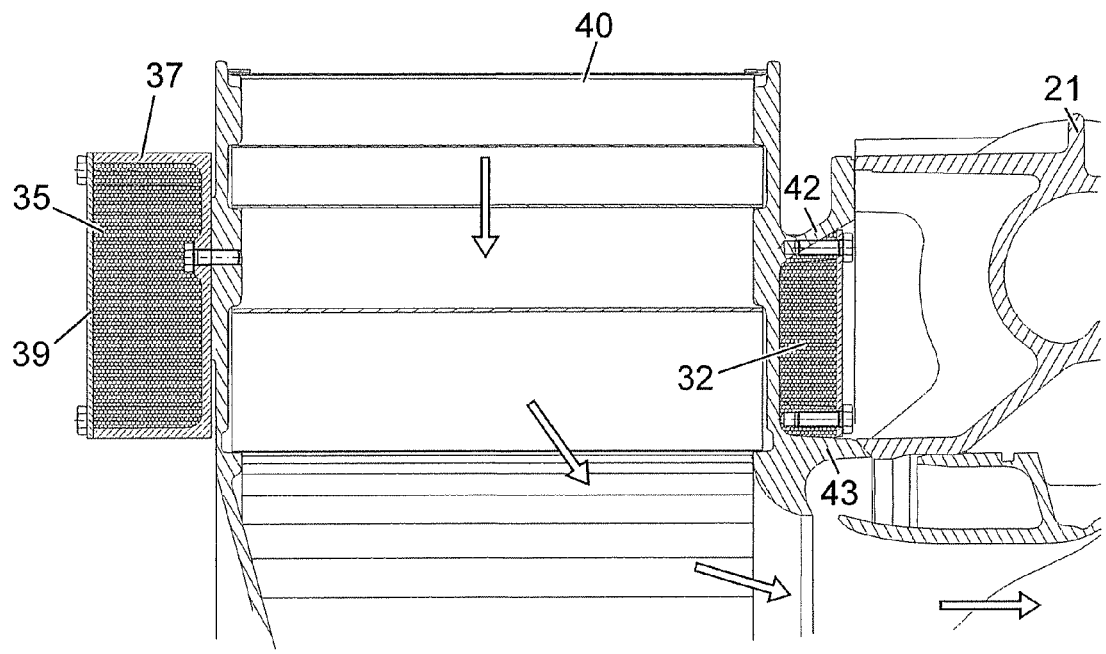
FIG. 6 shows the exemplary embodiment according to FIG. 3 with a separate particle-filled cavity on the side on the filter silencer.

FIG. 6 shows the exemplary embodiment according to FIG. 3, in which a particle-filled cavity 32 is formed on the housing of the filter silencer 40, but with an additional particle-filled cavity 35 at the opposite end of the filter silencer. This additional cavity can be formed as an encompassing annular cavity which is possibly subdivided by means of radial ribs, or can comprise a plurality of separate annular segment-shaped boxes. In this exemplary embodiment, the particle-filled cavity 35, that is to say the particle damper, is located in a zone with large vibration amplitudes. In this way, an increased damping can be achieved. This additional particle damper as a module can be fastened on the filter silencer in an optional manner, i.e. alone or additionally, if for example the integrated particle damper would not be adequate.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 Compressor wheel
21 Exhaust casing of the compressor casing

22 Outer fastening flange of the compressor casing
23 Inner fastening flange of the compressor casing
24 Insert wall of the compressor casing
25 Casing insert of the compressor casing
31 to 35 Particle-filled cavity
37 Cavity housing
38 Cavity cover
39 Cavity closure
40 Filter silencer
42 Outer fastening flange of the filter silencer housing
43 Inner fastening flange of the filter silencer housing

What is claimed is:

1. An exhaust gas turbocharger, comprising a compressor, a filter silencer, and a casing with at least one cavity, the at least one cavity being a particle vibration damper filled at least partially with particles, and formed with an annular shape, and wherein the at least one cavity is delimited by the filter silencer.

2. The exhaust gas turbocharger as claimed in claim 1, wherein the at least one cavity is arranged between the compressor and the filter silencer, and is delimited by a housing of the filter silencer and a compressor casing.

3. The exhaust gas turbocharger as claimed in claim 1, wherein the compressor comprises an inlet section, and the cavity is arranged radially outside the inlet section of the compressor.

4. The exhaust gas turbocharger as claimed in claim 1, wherein the filter silencer is arranged adjacent to the compressor.

5. The exhaust gas turbocharger as claimed in claim 1 wherein the at least one cavity includes radial ribs.

6. An exhaust gas turbocharger, comprising a casing with at least one cavity, wherein the at least one cavity being a particle vibration damper filled at least partially with particles and formed with an annular shape, and wherein the at least one cavity is delimited by a cavity housing which is fastened on a filter silencer of the exhaust gas turbocharger.

7. The exhaust gas turbocharger as claimed in claim 6, wherein the cavity is delimited by a cavity closure which can be opened to admit particles into the cavity, and can then be closed.

8. The exhaust gas turbocharger as claimed in claim 6, wherein at least one of rubber granulate, rubber dust and liquid is included with the particles.

9. An exhaust gas turbocharger, comprising a casing with at least one cavity, wherein the at least one cavity being a particle vibration damper filled at least partially with particles and formed with an annular shape, and wherein at least one of rubber granulate, rubber dust and liquid is included with the particles, wherein the casing walls on the inner side of the cavity are hardened or rubber-coated.

10. An exhaust gas turbocharger, comprising a casing with at least one cavity, wherein the at least one cavity of the exhaust gas turbocharger being a particle vibration damper filled at least partially with particles formed with an annular shape, and wherein the casing walls on the inner side of the cavity are hardened or rubber-coated.

11. The exhaust gas turbocharger as claimed in claim 10, wherein the particles are formed of at least one of a substantially globular or substantially spherical shape.

* * * * *